(12) United States Patent
Sundin et al.

(10) Patent No.: US 8,424,305 B2
(45) Date of Patent: *Apr. 23, 2013

(54) TURBO COMPRESSOR SYSTEM FOR AN INTERNAL COMBUSTION ENGINE COMPRISING A COMPRESSOR OF RADIAL TYPE AND PROVIDED WITH AN IMPELLER WITH BACKSWEPT BLADES

(75) Inventors: Lars Sundin, Malmö (SE); Magnus Ising, Lund (SE); Sebastian Krausche, Höllviken (SE); Per Andersson, Malmö (SE)

(73) Assignee: Volvo Lastvagnar AB, Göteborg (SE)

( * ) Notice: Subject to any disclaimer, the term of this patent is extended or adjusted under 35 U.S.C. 154(b) by 837 days.

This patent is subject to a terminal disclaimer.

(21) Appl. No.: 11/164,226

(22) Filed: Nov. 15, 2005

(65) Prior Publication Data
US 2006/0123785 A1 Jun. 15, 2006

Related U.S. Application Data

(63) Continuation of application No. PCT/SE2004/000740, filed on May 13, 2004, now abandoned, and a continuation of application No. PCT/SE2004/000715, filed on May 11, 2004, now abandoned.

(30) Foreign Application Priority Data

May 15, 2003 (SE) .................................. 0301412-3

(51) Int. Cl.
| | |
|---|---|
| F02B 33/44 | (2006.01) |
| F02B 37/013 | (2006.01) |
| F04D 29/30 | (2006.01) |
| F04D 29/44 | (2006.01) |
| F04D 29/54 | (2006.01) |
| F01D 5/14 | (2006.01) |

(52) U.S. Cl.
USPC ....... 60/612; 415/199.2; 415/208.3; 415/228; 416/241 R; 416/241 A; 416/185

(58) Field of Classification Search .................... 60/612; 415/58, 183, 188, 199.2, 211.2, 208.3, 228; 416/241 R, 241 A, 185; 417/211, 42
See application file for complete search history.

(56) References Cited

U.S. PATENT DOCUMENTS

| | | | |
|---|---|---|---|
| 2,759,662 A | | 8/1956 | Carrier |
| 2,806,645 A | * | 9/1957 | Stalker ....................... 415/210.1 |

(Continued)

FOREIGN PATENT DOCUMENTS

| | | | |
|---|---|---|---|
| EP | 0014778 A1 | | 9/1980 |
| EP | 1275832 A2 | * | 1/2003 |

(Continued)

OTHER PUBLICATIONS

Translation of EP1275832 A.*

(Continued)

*Primary Examiner* — Thai Ba Trieu
(74) *Attorney, Agent, or Firm* — WRB-IP LLP

(57) ABSTRACT

A turbocharger unit (18) for an internal combustion engine (10) with at least one exhaust line (15, 16) for conducting exhaust gases away from the combustion chamber (11) of the engine and at least one inlet line (12) for supplying air to the combustion chamber. The turbocharger unit includes a turbine (17) which interacts with a compressor (19) for extracting energy from the exhaust gas flow of the engine and pressurizing the inlet air of the engine. The compressor (19) is of radial type and provided with an impeller with backswept blades (35) where the blade angle ($\beta_{b2}$) between an imaginary extension of the center line of the blade between root section and tip section in the direction of the outlet tangent and a line (36) which connects the center axis of the impeller to the outer tip of the blade is at least roughly 45°. The turbine (17) which drives the compressor (19) is of radial type.

7 Claims, 3 Drawing Sheets

U.S. PATENT DOCUMENTS

| | | | | |
|---|---|---|---|---|
| 3,005,334 | A | * | 10/1961 | Taylor et al. .................... 73/577 |
| 3,292,364 | A | * | 12/1966 | Cazier ........................... 415/183 |
| 3,552,877 | A | * | 1/1971 | Christ et al. ................ 415/211.2 |
| 3,811,495 | A | * | 5/1974 | Laing .......................... 60/39.512 |
| 3,984,193 | A | * | 10/1976 | Yu .................................. 416/185 |
| 4,188,169 | A | * | 2/1980 | Mowill .......................... 416/185 |
| 4,344,289 | A | * | 8/1982 | Curiel et al. .................... 60/612 |
| 4,556,528 | A | * | 12/1985 | Gersch et al. .................. 264/221 |
| 4,629,396 | A | | 12/1986 | Lorett ........................... 415/164 |
| 4,824,325 | A | * | 4/1989 | Bandukwalla ................ 417/211 |
| 5,145,317 | A | * | 9/1992 | Brasz ........................ 415/224.5 |
| 5,639,217 | A | * | 6/1997 | Ohtsuki et al. ................. 416/183 |
| 5,730,580 | A | * | 3/1998 | Japikse ...................... 415/208.3 |
| 5,924,847 | A | * | 7/1999 | Scaringe et al. ................ 417/42 |
| 6,062,819 | A | * | 5/2000 | Zangeneh et al. ............. 416/188 |
| 6,269,643 | B1 | | 8/2001 | Schmidt et al. ................. 60/602 |
| 6,422,014 | B1 | | 7/2002 | Gladden ......................... 60/602 |
| 6,553,763 | B1 | * | 4/2003 | Callas et al. ............... 416/241 R |
| 2006/0039791 | A1 | * | 2/2006 | Kim ............................... 416/228 |
| 2006/0067829 | A1 | * | 3/2006 | Vrbas et al. ............... 416/223 R |
| 2007/0036647 | A1 | * | 2/2007 | Abdelwahab et al. ..... 415/211.2 |
| 2009/0196762 | A1 | * | 8/2009 | Koga ........................ 416/241 R |

FOREIGN PATENT DOCUMENTS

| | | | | |
|---|---|---|---|---|
| EP | 2036993 | A1 | * | 3/2009 |
| FR | 2282058 | | * | 3/1976 |
| GB | 1438172 | A | | 6/1976 |
| GB | 2058941 | A | | 4/1981 |
| JP | 2000015394 | A | * | 1/2000 |

OTHER PUBLICATIONS

Machine Translation of Schmidt (DE 42 42 494 C1), published on Sep. 9, 1993.*

International Search Report dated Aug. 12, 2004 from International Application PCT/SE2004/000740.
Rodgers, C., "Specific Speed and Efficiency of Centrifugal Impellers" Performance Predictions of Centrifugal Pumps and Compressors, Mar. 1980 pp. 191-200.
Wilson, David Gordon et al., "The Design of High-Efficiency Turbomachinery and Gas Turbines, Second Edition" Prentice Hall, Inc., 1998, Ed. 2. ISBN: 0-13-312000-7, pp. 232-241.
David Japikse, "Centrifugal Compressor Design and Performance", 1996.
"Introduction to turbochargers", Schwitzer, 1984.
A. Whitfield et al., "Design and performance of a high-pressure ratio turbocharger compressor—Part 1: design considerations", IMechE 1993.
Ernst Jenny, "The BBC Turbocharger", pp. 191-195, 1993.
JP 10212966 A (Englsih abstract and original document).
N. Watson and M.S. Janota, "Turbocharging the Internal Combustion Engine", J. Wiley & Sons, 1982.
G.F. Hiett and I.H. Johnson, "Experiments concerning the aerodynamic performance performance of inward flow radial turbines", Proc. Instn Mechn Engrs 1963-64.
H. Chen and W. Connor, "Turbocharger compressor developments for passenger car gasoline engine application", in "IMechE Conference Transactions—Turbochargers and Turbocharging", May 14-15, 2002.
D.W.H. Tennant, "A compact two-stage turbocharger module", m "Proceedings of the Institution of Mechanical Engineers—Turbochargers and Turbocharging", May 22-24, 1990.
Colin Rodgers, "Centrifugal compressor design options for small turbochargers", 1998.
Thomas Oatway et al., "Investigations of a variable geometry compressor for a diesel engine turbocharger", Aug. 1973.

* cited by examiner

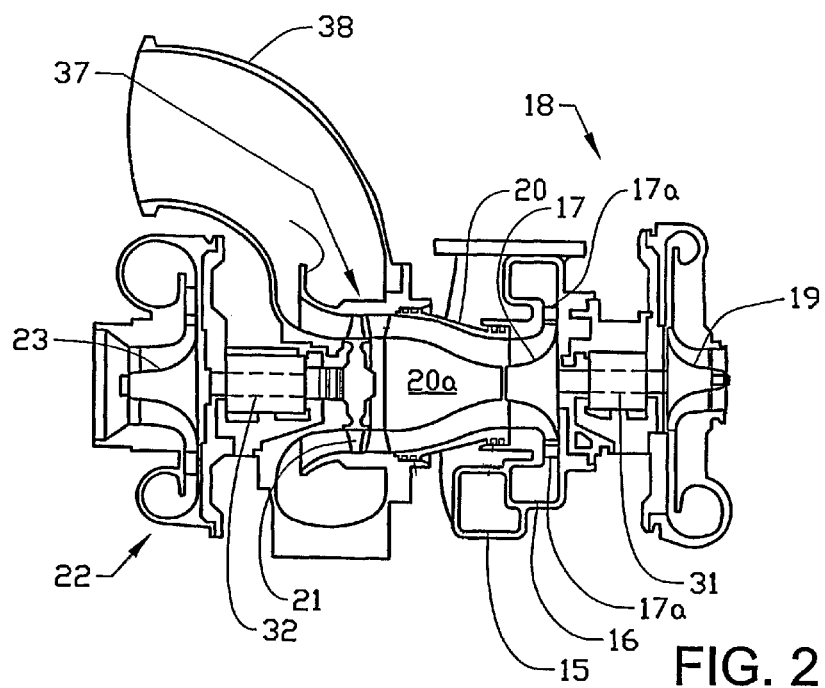
FIG. 2
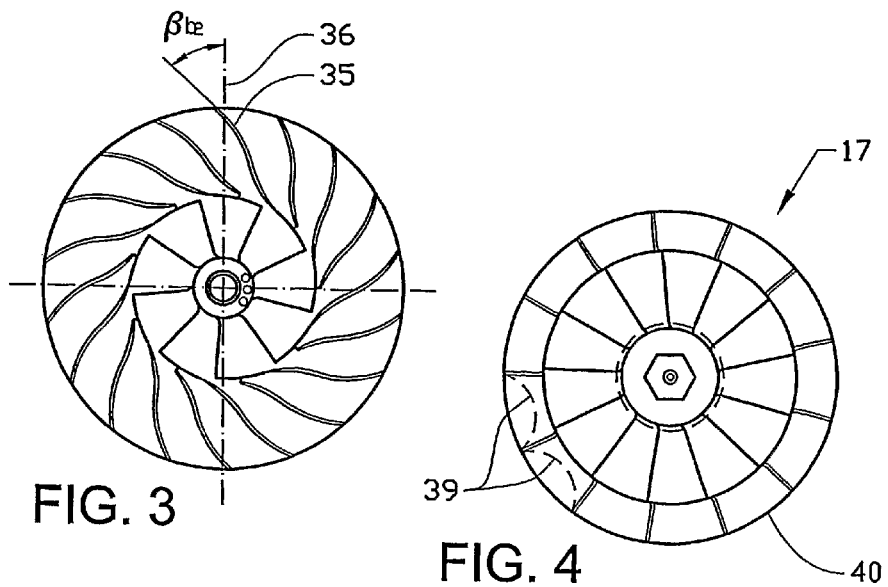
FIG. 3
FIG. 4

TURBO COMPRESSOR SYSTEM FOR AN
INTERNAL COMBUSTION ENGINE
COMPRISING A COMPRESSOR OF RADIAL
TYPE AND PROVIDED WITH AN IMPELLER
WITH BACKSWEPT BLADES

CROSS-REFERENCE TO RELATED APPLICATIONS

The present application is a continuation patent application of International Application No. PCT/SE2004/000740 filed 13 May 2004 and International Application No. PCT/SE2004/000715 filed 11 May 2004, both of which were published in English pursuant to Article 21(2) of the Patent Cooperation Treaty, and both of which claim priority to Swedish Application No. 0301412-3 filed 15 May 2003. Said applications are expressly incorporated herein by reference in their entireties.

TECHNICAL FIELD OF THE INVENTION

The present invention relates to a turbocharger unit for an internal combustion engine with at least one exhaust line for conducting exhaust gases away from the combustion chamber of the engine and at least one inlet line for supplying air to the combustion chamber, together with a turbine which interacts with a compressor for extracting energy from the exhaust gas flow of the engine and pressurizing the inlet air of the engine.

BACKGROUND OF THE INVENTION

Current technology relating to turbocharger systems for supercharging internal combustion engines of the diesel type, in particular for heavy-duty vehicles, which usually include a single-stage compressor that is driven by a single-stage turbine, both of radial type.

Superchargers suitable for a diesel engine with a stroke volume of 6 to 20 liters normally have an efficiency, under stationary conditions, of between 50% and 60% ($?_{compressor} * ?_{mechanical} * ?_{turbine}$) In current diesel engines, the benefit of good efficiency is lower than it will be for future engines which will require higher charging pressure. Examples of systems which increase the requirement for supercharging are exhaust gas recirculation for lower emissions of nitrogen oxide or systems with variable control of inlet valves.

Turbocharger systems with an efficiency higher than 60%, under stationary conditions, afford an increased possibility of meeting future requirements for environment-friendly and economical engines. Previously, environmental requirements for diesel engines have usually led to impaired efficiency, which has consequently meant that the energy resource of the fuel has been more poorly utilized.

Modern impellers are usually provided with backswept blades where the blade angle $\beta_{b2}$ between an imaginary extension of the center line of the blade between root section and tip section in the direction of the outlet tangent and a line which connects the center axis of the impeller to the outer tip of the blade lies below 35°.

Radial turbines used in turbochargers are often provided with scallop cutouts between the turbine blades (see FIG. 4) for reducing the mass of the turbine wheel, which results in improved transient response, that is to say increases the capacity of the turbine wheel for reacting to an increased exhaust gas flow. This makes it possible for an engine to increase speed more rapidly by virtue of the scallop cutouts reducing the polar moment of inertia because they eliminate material at the periphery of the turbine wheel. However, the scallop cutouts have a negative effect on the efficiency of the turbine owing to flow leakage from the pressure side to the suction side at the outer ends of the turbine blades. Another reason for providing the turbine with scallop cutouts is to reduce stresses owing to uneven temperature during starting, stopping and load changes. Problems of uneven temperature distribution are greater in wheels of large diameter.

A disadvantage of increasing the blade angle/3 of the compressor is that the peripheral speed and thus stresses in the impeller increase for the same pressure ratio. This means that materials with greater strength properties may be required. For example, the current cast aluminum impellers and wheels may be replaced by considerably more expensive forged and machined aluminum or titanium components.

SUMMARY OF THE INVENTION

It is therefore an object of the invention to produce a turbocharger unit with good characteristics in terms of both transient response and efficiency.

A turbocharger unit designed for this purpose according to the invention for an internal combustion engine with at least one exhaust line for conducting exhaust gases away from the combustion chamber of the engine and at least one inlet line for supplying air to the combustion chamber comprises (includes, but is not necessarily limited to) a turbine which interacts with a compressor for extracting energy from the exhaust gas flow of the engine and pressurizing the inlet air of the engine. The compressor is of radial type and provided with an impeller with backswept blades where the blade angle $\beta_{b2}$ between an imaginary extension of the center line of the blade between root section and tip section in the direction of the outlet tangent and a line which connects the center axis of the impeller to the outer tip of the blade is at least roughly 45°, and in that the turbine which drives the compressor is of radial type. By virtue of this design of the turbocharger unit, the efficiency can be kept high at the same time as the transient response is improved.

Increasing the blade angle $\beta_{b2}$ of the compressor results in the pressure increase for a given rotational speed decreasing. In order to compensate for this, a higher speed or larger impeller diameter is required. An unexpected effect, however, is that optimum rotational speed for the compressor construction increases more than is required in order to maintain the pressure increase and the diameter can therefore even be reduced.

This can be seen from FIGS. 5 and 6 where FIG. 5 shows the work factor $\Delta h_0/U^2$ of the impeller as a function of the blade angle $\beta_{b2}$, where $\Delta h_0$ is the enthalpy increase and U is the peripheral speed of the impeller. An increase in the blade angle $\beta_{b2}$ from, for example, 45° to 55° means that the work factor decreases by roughly 5%. In order to maintain the pressure ratio, the peripheral speed U must then be increased by roughly 2.5% ($\sqrt{1.05}=1.025$), assuming unchanged efficiency.

Optimum rotational speed can be read off from FIG. 6 which shows efficiency as a function of specific rotational speed Ns and blade angle $\beta_{b2}$. Specific rotational speed Ns is defined here as $Ns=\omega \cdot \sqrt{V}/(H_{ad})^{3/4}$ where $\omega$=angular speed, V=inlet volume flow, $H_{ad}$=adiabatic enthalpy increase ($=C_p \cdot T_{0,in} \cdot ((\text{pressure ratio})^{((k-1)/k)}-1)$). It can be seen from Diagram 2 that optimum Ms and thus rotational speed, at unchanged volume flow, pressure ratio and inlet conditions, increases by roughly 4% when the blade angle $\beta_{b2}$ is increased from 45° to 55°.

The radial turbine which is to drive the compressor can be reduced in diameter at least corresponding to the higher rotational speed of the compressor, which results in a lower polar moment of inertia. An alternative improvement possibility is for the scallop cutouts to be reduced or dispensed with. This means that the efficiency is increased, which itself means that an even smaller diameter can be used.

Advantageous illustrative embodiments of the invention emerge from the following dependent patent claims.

Using the turbocharger described in a two-stage turbo system has the advantage that each turbocharger works with a smaller pressure increase and thus a lower rotational speed. In such cases, current materials can be used in spite of the large backsweep angle ($\beta_{b2}$).

BRIEF DESCRIPTION OF THE DRAWINGS

The invention will be described in greater detail below with reference to illustrative embodiments shown in the accompanying drawings, in which:

FIG. 2 is a longitudinal section through the two turbocharger stages included in the turbocharger system;

FIG. 3 shows a partly broken plan view of an impeller which is used in the turbocharger unit according to the invention;

FIG. 4 shows a plan view of the turbine wheel of the high-pressure turbine;

DETAILED DESCRIPTION

The invention is described as applied in a two-stage supercharging system for primarily diesel engines with a stroke volume of between 6 and roughly 20 liters, for use preferably on heavy-duty vehicles such as trucks, buses and construction machinery. A characteristic of the supercharging system is that it provides considerably more effective supercharging compared with current systems. The supercharging takes place in two stages with two series-connected compressors of radial type with intermediate cooling. The first compressor stage, referred to as the low-pressure compressor, is driven by a low-pressure turbine of axial type. The second compressor stage, the high-pressure compressor, is driven by a high-pressure turbine of radial type.

Figure 1:
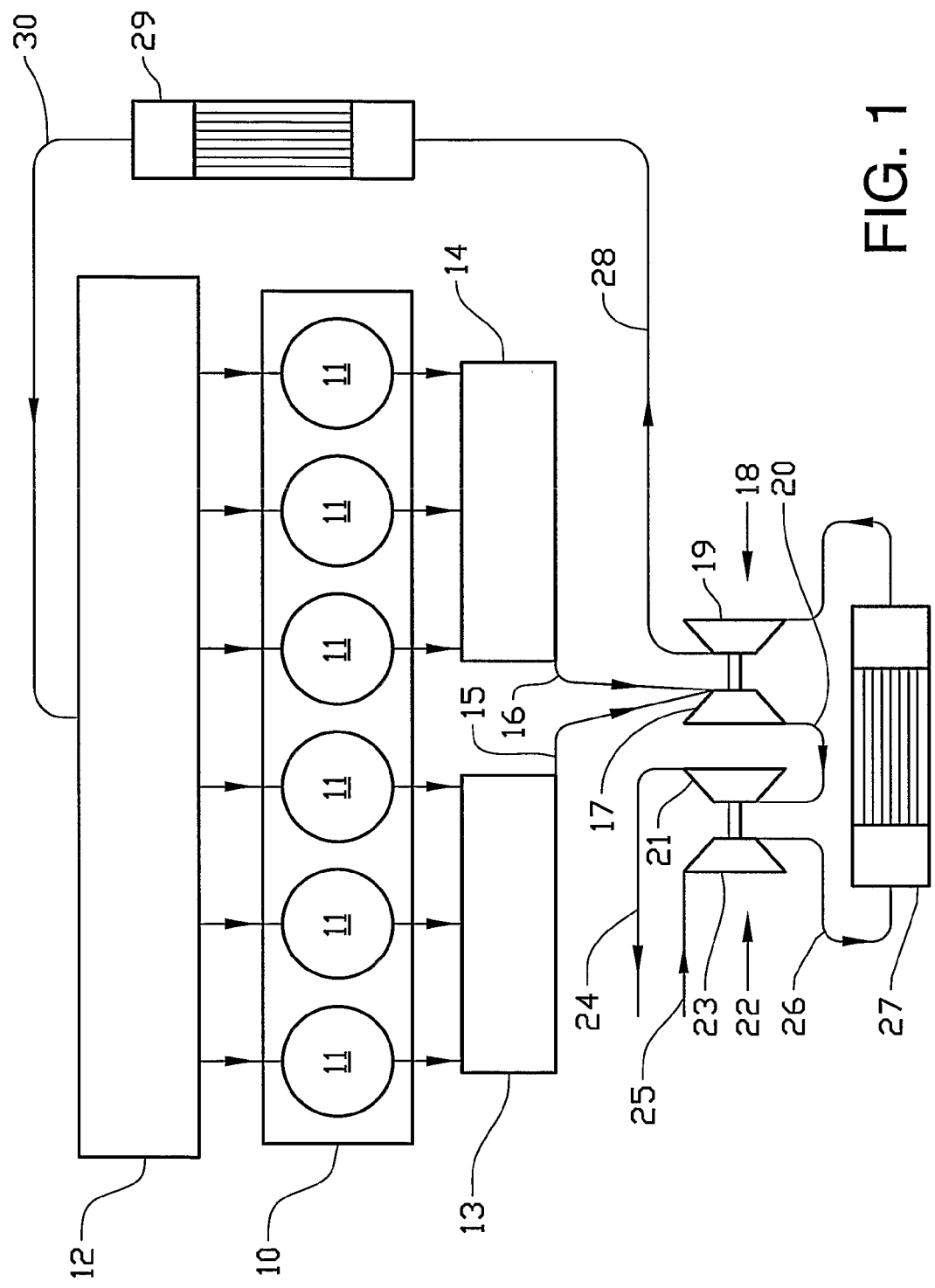
FIG. 1 shows diagrammatically an internal combustion engine with a two-stage turbocharger system.
Figure 5:
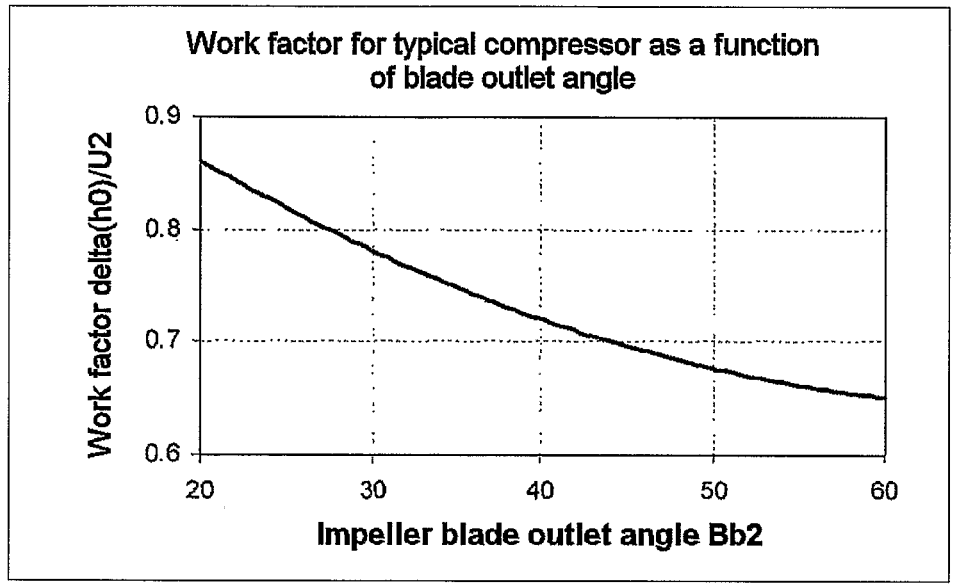
FIG. 5 is a graphical representation of a compressor work factor as a function of blade outlet angle.
Figure 6:
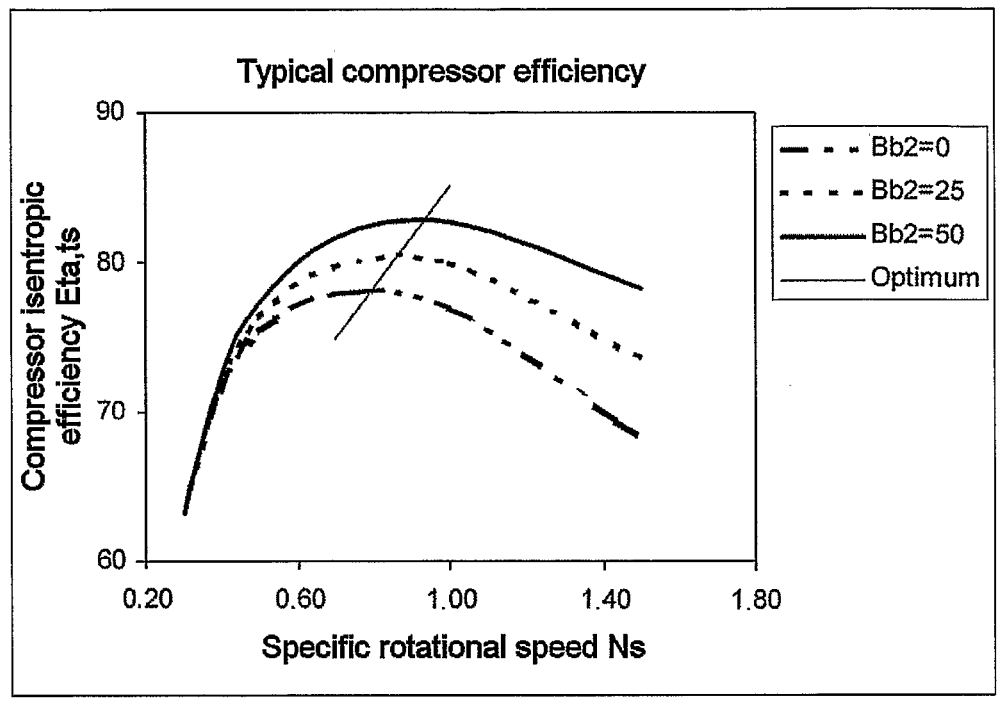
FIG. 6 is a graphical representation of compressor efficiency.

FIG. 1 shows an engine block 10 with six engine cylinders 11 which in a conventional way communicate with an inlet manifold 12 and two separate exhaust manifolds 13,14. Each of these two exhaust manifolds receives exhaust gases from three of the engine cylinders. The exhaust gases are conducted via separate pipelines 15, 16 to a turbine 17 in a high-pressure turbo unit 18, which comprises a compressor 19 mounted on a common shaft with the turbine 17.

The exhaust gases are conducted onward via a pipeline 20 to a turbine 21 in a low-pressure turbo unit 22, which comprises a compressor 23 mounted on a common shaft with the turbine 21. The exhaust gases are finally conducted onward via a pipeline 24 to the exhaust system of the engine, which can comprise units for after treatment of exhaust gases.

Filtered inlet air is admitted to the engine via the pipeline 25 and is conducted to the compressor 23 of the low-pressure turbo unit 22. A pipeline 26 conducts the inlet air onward via a first charge air cooler 27 to the compressor 19 of the high-pressure turbo unit 18. After this charging in two stages with intermediate cooling, the inlet air is conducted onward via the pipeline 28 to a second charge air cooler 29, after which the inlet air reaches the inlet manifold 12 via the pipeline 30.

The turbocharger system is shown in greater detail in FIG. 2 which illustrates the double, spiral inlets 15,16 to the high-pressure turbine 17, which each provide half the turbine with gas flow via inlet guide vanes 17a. The high-pressure turbine 17 is of radial type and is connected to the low-pressure turbine 21 via the intermediate duct 20.

The high-pressure turbine 17 is mounted together with the high-pressure compressor 19 on the shaft 31. The low-pressure turbine 21 is in a corresponding way mounted together with the low-pressure compressor 23 on the shaft 32.

The high-pressure turbo is designed according to the invention described and consists of a high-pressure compressor with blades which are designed with a large backsweep, which will be described below with reference to FIG. 3.

It can be seen from FIG. 3 that a blade angle $\beta_{b2}$ between an imaginary extension of the blade 35 along the center line between root section and tip section in the direction of the outlet tangent and a (dot-dash) line 36 which connects the center axis of the impeller to the outer tip of the blade is at least roughly 45°, suitably at least roughly 50-55°. Turbocompressors available on the market have blade angles $\beta_{b2}$ of between roughly 25 and roughly 35°. Testing a turbocharger system according to the invention has shown it to be advantageous to increase the blade angle to at least roughly 45°. The effect of this increase in the blade angle consists primarily in that the impeller with associated turbine rotates at a higher rotational speed for a given pressure ratio. The increase in the speed means that the diameter and thus also the mass inertia of the turbine wheel can be reduced. As a secondary effect of this, the transient response of the engine is also improved as the reduced mass inertia means that the turbine wheel can accelerate more easily to its effective speed range. The compressor efficiency also increases, inter alia as a consequence of a reduced speed difference between the flow along the pressure side and suction side of the blade, which leads to a smaller secondary flow and thus lower losses, and also owing to the flow rate in the rotor outlet being reduced, which leads to lower losses in the diffuser which follows.

Both the compressors are provided with guide vanes downstream of the respective impeller in order to optimize the pressure build-up. This diffuser is advantageously of LSA (Low Solidity Airfoil) type, which means a diffuser with aerodynamically designed blades, the length of which has a ratio to the spacing between the blades (pitch), in the circumferential direction in the inlet, which lies in the range 0.75-1.5. A characteristic of this diffuser type is that it does not limit the possible working range (combination of pressure ratio and volume flow) of the compressor as much as a conventional diffuser with long blades.

An outlet diffuser 37 is located after the low-pressure turbine 21 in order to recover dynamic pressure from the turbine. The diffuser runs into an exhaust collector 38 which guides the exhaust gases out to the exhaust pipe 24.

The high-pressure turbine 17 shown in FIG. 4 which drives the high-pressure compressor 19 is of radial type with a turbine wheel which, for rotation at relatively high rotational speeds, is made with a small diameter. This makes it possible to avoid cutouts 39 in the turbine wheel hub 40 of the kind which are normally used according to the state of the art in this type of turbine (what is known as scalloping). These cutouts 39 are shown by dashed lines in FIG. 4, simply to illustrate the state of the art. Owing to the fact that these cutouts are not required, the turbine wheel can work more effectively for a higher overall efficiency.

The invention is not to be regarded as being limited to the illustrative embodiments described above, but a number of further variants and modifications are conceivable within the scope of the following patent claims. For example, the turbocharger unit according to the invention is described in connection with a six-cylinder diesel engine with two-stage turbocharging, but the invention can be applied to all different piston engines from one cylinder upward and which are driven in two-stroke or four-stroke operation. The invention can also be applied to marine engines and engines with stroke volumes other than those mentioned above. The high-pressure turbine 17 can have no inlet guide vanes or alternatively be provided with fixed or geometrically rotatable inlet guide vanes 17a.

What is claimed is:

1. A turbocharger unit for an internal combustion engine with at least one exhaust line for conducting exhaust gases away from the combustion chamber of the engine and at least one inlet line for supplying air to the combustion chamber and a turbine which drives a radial-type compressor mounted on a common shaft with the turbine by the turbine extracting energy from the exhaust gas flow of the engine so that the compressor pressurizes inlet air of the engine, wherein the compressor has an impeller with backswept blades where, for each blade of the plurality of blades, a blade angle between an imaginary extension of a center line of the blade between a root section and a tip section thereof in a direction of an outlet tangent and a line which connects a center axis of the impeller to an outer tip of the blade is at least about 45°, and wherein the turbine comprises a radial turbine comprising a hub without cutouts.

2. The turbocharger system as recited in claim 1, wherein the blade angle is at least about 55°.

3. The turbocharger system as recited in claim 1, wherein the compressor is provided with a diffuser of LSA (low solidity airfoil) type.

4. The turbocharger system as recited in claim 1, wherein the turbocharger is configured as a turbo system with two-stage charging with compressors and turbines arranged in series.

5. The turbocharger system as set forth in claim 1, wherein the radial turbine and the radial-type compressor define a high-pressure turbo unit, the turbocharger system further comprising a low-pressure turbo unit comprising a second turbine and a second radial compressor mounted on a second common shaft with and driven by the second turbine.

6. The turbocharger system as set forth in claim 5, wherein the second turbine is an axial turbine.

7. The turbocharger system as set forth in claim 1, wherein the impeller is made of cast aluminum.

\* \* \* \* \*